United States Patent [19]

Schenk

[11] 4,004,486
[45] Jan. 25, 1977

[54] QUICK RELEASE FASTENER

[75] Inventor: Peter Schenk, West Islip, N.Y.

[73] Assignee: Dzus Fastener Co., Inc., West Islip, N.Y.

[22] Filed: Dec. 8, 1975

[21] Appl. No.: 639,004

[52] U.S. Cl. .................................. 85/64; 151/36
[51] Int. Cl.² ...................................... F16B 13/04
[58] Field of Search ............ 85/64, DIG. 3; 151/36, 151/41.75; 24/221 K

[56] References Cited

UNITED STATES PATENTS

| 768,283 | 8/1904 | Jenkins | 85/64 |
| 1,586,904 | 6/1926 | Kuhn | 85/DIG. 3 |
| 3,152,375 | 10/1964 | Blakeley | 85/64 X |
| 3,564,563 | 2/1971 | Trotter et al. | 24/221 K |

FOREIGN PATENTS OR APPLICATIONS

| 2,110,684 | 9/1972 | Germany | 85/64 |
| 130,823 | 2/1951 | Sweden | 85/64 |
| 1,378,836 | 12/1974 | United Kingdom | 85/64 |

Primary Examiner—Roy D. Frazier
Assistant Examiner—Rodney H. Bonck
Attorney, Agent, or Firm—Kane, Dalsimer, Kane, Sullivan and Kurucz

[57] ABSTRACT

A fastener assembly for use in the blind fastening of first and second parts having aligned apertures extending therethrough with the aperture in the second part being larger than the aperture in the first part. A stud member with a screw threaded shank is adapted to be projected through the aligned apertures with the head being positioned on the outer side of the first part and being larger than the aperture in the first part. A threaded nut is adapted to be coupled with the shank and is smaller in diameter than the aperture in the second parts so it can be projected therethrough and to be located on the opposite side of the second part from the first part. A helical spring having a normal outer diameter larger than the aperture in the first part and smaller than the aperture in the second part is assembled around the stud in engagement with the nut. The spring is expandable to have a larger diameter. A second biasing spring is preloaded and bears against the under surface of the first part and the nut so that when the assembled shank portion of the stud and the springs and nut are inserted through the aperture in the second part a biasing force is applied to the nut substantially in an axial direction. Thereafter, upon rotation of the stud the nut is retained against rotation to permit axial movement thereof along the shank to apply a biasing force to the helical spring and expand the spring into engagement with the surface of the second part and retain the second part in fixed relation to the first part. The same biasing action will occur to permit relative rotation in loosening the fastener and permitting disassembly of the first and second part.

6 Claims, 3 Drawing Figures

QUICK RELEASE FASTENER

BACKGROUND OF THE INVENTION

There are many applications in the use of fasteners where the parts are being fastened in locations where access to the rear of the members is impossible or the hole in the second member is a blind hole. In such circumstances it is impossible to retain one portion of the fastener assembly in fixed position while the other portion is rotated so as to bring the fastener into a position where it locks the two members together. This type of situation frequently occurs when dealing with panel to panel arrangements.

There have been many suggested solutions to the problem and there is always room for further improvements to advance the dependability of the fastener for repeated use and for use of a large number of fasteners in many different environments.

SUMMARY OF THE INVENTION

With the above background in mind, it is among the primary objectives of the present invention to provide a quick release fastener assembly which is adapted for fastening together two separate members with aligned apertures where the opening in the second member is a blind hole or where the second member is a panel with only the front being accessable. The fastener is designed so that it is dependable and will permit shifting between the fastened and unfastened positions quickly and efficiently and reliably for repeated use and in environments where a large number of fasteners are employed.

The fastener assembly includes a stud and nut and a helical coil spring as the basic assembly. Additionally biasing means are provided to assist in retaining the nut in fixed position when the stud is rotated. The stud includes an enlarged head and a smaller diameter screw threaded shank extending therefrom. The nut is provided with a tapering nose facing the enlarged head of the stud and has a screw threaded passage therethrough to permit its axial movement with respect to the shank of the stud. The device is designed for use with a two part assembly with aligned apertures with the opening in the first member being smaller than the opening in the second member. In this manner, the stud can be passed through the aperture in the first member with the under surface of the head bearing against the outer surface of the first member. Then, the spring can be passed onto the shank of the stud and the nut threaded into engagement with the shank capturing the spring between the tapered surface on the nut and the rear surface of the first member. The larger hole in the second member will then accept the nut, shank and spring therethrough in a position where rotation of the stud will cause axial shifting of the position of the nut on the shank and compression of the spring thereby expanding the helical spring into tighter interengagement with the second member and fastening the first and second member together. To facilitate the relative rotation between the stud and the nut, a biasing means is employed on the assembly to exert a force on the nut to retain it in fixed rotational position when the stud is being rotated.

Rotation of the fastener head into the locking position causes a combined biasing force exerted by the helical spring and the biasing means to provide a frictional constraint against rotation of the nut with the stud shank so that the nut is drawn up towards the head of the stud, whereupon the nose of the nut expands the adjacent end of the spring into jamming relationship with the second member around the aperture in the second member.

This construction is very simple and effective and enables a quick release of the first member from the second member by simply rotating the stud head in the opposite direction to cause the nut to back off whereupon the shank, spring and nut can be withdrawn again from the hole in the second member. The fastener can then be reused. The biasing means is also designed so that it can be passed into and out of the aperture in the second member so that it acts in coordination with the remaining components of the fastener.

The end of the spring adjacent to the stud head may abut against the head but more usually the fastener will be extended through a hole in a first member, the head abutting the front face of the first member and the spring taking its reaction from the rear face of the first member.

When the fastener is undone, it may happen that the head is rotated more than is necessary whereupon the nut may be unscrewed along the shank so far that the spring and biasing means are no longer in compression. This may make resecuring of the fastener difficult as there will be negligible friction between the spring, biasing member and nut to prevent the nut rotating with the shank. A stop is therefore preferably provided to limit the axial extent to which the nut can be unscrewed along the shank so that the spring and biasing means always remain in compression. The stop may be provided by an integral abutment, such as a shoulder on the shank or by distortion of the screw threads on the shank. Preferably, however, a simple lock nut is used and this may be made of a plastic material and can be self threading and a very tight fit on the screw threads of the shank.

With the above objectives among other in mind, references had to the attached drawings.

DESCRIPTION OF THE PREFERRED EMBODIMENTS

Figure 1:
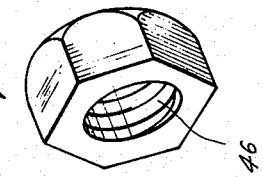
FIG. 1 is an exploded perspective view of the fastener shown with a fragmentary portion of a first member to be fastened.
Figure 1:
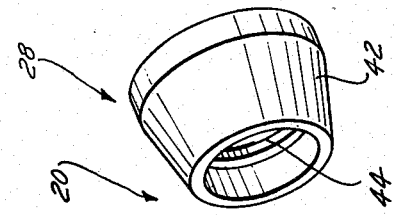
Figure 1:
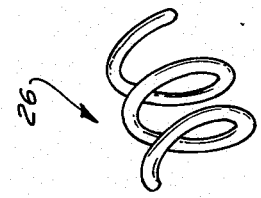
Figure 1:
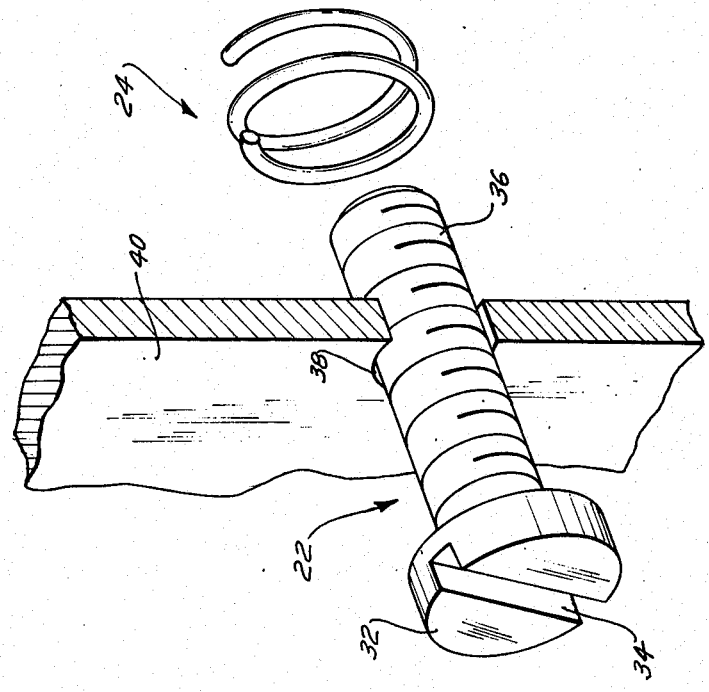

In FIG. 1 fastener 20 is shown in the disassembled condition and includes a stud 22, a first larger helical spring 24, a second smaller helical spring 26, a nut 28 and a stop nut 30.

Stud 22 includes an enlarged head 32 with a slot for receiving a tool such as a screwdriver to facilitate rotation of the stud. A tubular threaded shank 36 extends from the head and is of lesser diameter than the head so as to fit through an aperture 38 in a first member or panel 40 to be fastened. Aperture 38 is large enough to receive the shank 36 of stud 22 therethrough but not large enough to receive head 32 and accordingly the under surface of the head engages with the exposed surface of member 40.

The two springs 24 and 26 have reverse windings for facilitating operation of the fastener and, in the embodiment shown, helical spring 24 which is of a larger diameter, is a left hand wound spring and spring 26, which is of a lesser diameter, is a right hand wound spring. Both springs have a sufficient inner diameter to permit passage over shank 36 and into engagement with the under surface of member 40.

Nut 28 has a tapered outer surface portion 42 at the end of the nut initially inserted on shank 36 and in engagement with the springs. The nut has a threaded inner surface 44 for interengagement with the threaded shank 36 of the stud to permit relative rotation there between and corresponding axial movement of the nut with respect to the shank.

The stop nut 30 is a conventional hexazonal nut with a threaded inner surface 46 of a predetermined dimension so that it tightly interengages with the threaded shank surface and can be maintained in a relatively fixed position on the shank so as to form a stop means.

In assembling the fastener, the stud 22 is passed through aperture 38 in member or panel 40 until the under surface of head 32 engages with the outer surface of member 40. Thereafter the larger spring 24 is inserted over the shank until it comes into engagement with the under surface 48 of panel 40. The narrower spring 26 can be passed onto shank 36 either before or after larger spring 24 and is extended until it also engages with under surface 48 of panel 40 at a point inside of the location of engagement of spring 24 with the panel. Conical nut 28 is than threaded onto shank 36 until it engages with both springs 26 and 24 and slightly compresses these springs thereby preloading the assembly. To accommodate the narrower dimension spring 26, a recess 50 terminating in a shoulder 52 is provided at the forward end of nut 28. The recess is dimensioned so that shoulder 52 engages with the free end of spring 26 and compresses spring 26 against the under surface 48 of panel 40. In this manner spring 26 in the biased condition acts as a biasing means to restrict rotation of nut 28 with respect to stud 22. This action is assisted by the fact that both free ends of spring 26 are shaped to extend axially and will dig in and grasp the material with which they are in engagement. It should be additionally noted that the extra length of spring 26 over spring 24 will cause it to be compressed to a greater degree than the larger diameter spring 24 and accordingly will act as a stronger biasing force to restrict the relative rotation between the stud and the nut.

Engagement between spring 24 and nut 28 is accomplished by interengagement between the spring and the tapered conical outer surface portion 42 of the nut. This interengagement between spring 24 and conical portion 42 will give an additional biasing force and will assist in preventing simultaneous rotation between nut 28 and stud 22.

Figure 2:
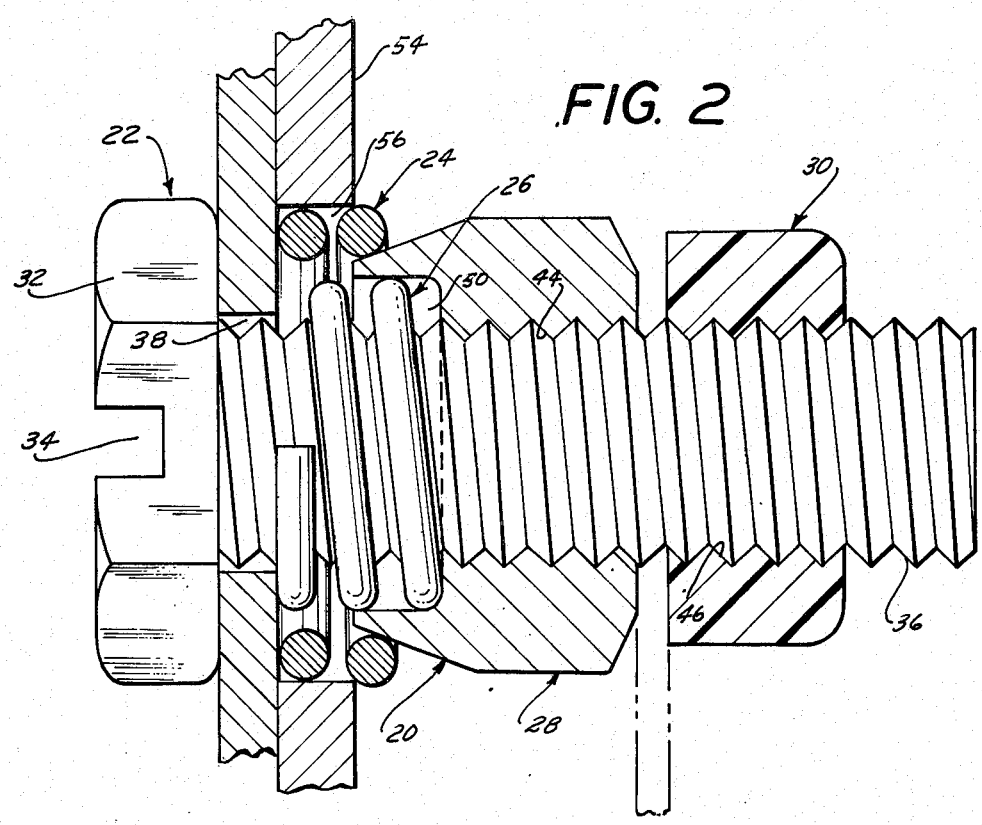
FIG. 2 is a sectional view of the fastener shown in position in holding two members together.

Stop nut 30 is than threadedly mounted on shank 36 and is fixed at the desired location. The fastener assembly is than complete and is coupled to a first member of panel 40. Panel 40 is then brought into engagement with a second member or panel 54 which has a larger aperture 56 therein than aperture 38 in panel 40. The apertures are placed in relative alignment so that the majority of shank 36 and the components assembled thereon namely springs 24 and 26 and nuts 28 and 30 can be passed through aperture 56. The assembly is then in position for a locking function. An appropriate tool such as a screwdriver is inserted in slot 34 and stud 22 is rotated. The biasing means in the form of inner spring 26 in cooperation with outer spring 24 prevents rotation of nut 28 as stud 22 is rotating. The result is that nut 28 will move axially toward member 54 thereby further compressing springs 24 and 26. The compression of larger diameter spring 24 will cause it to expand and engage with the surface forming and surrounding opening 56 of panel 54. In this manner panel 54 is captured in locking interengagement with panel 40. This condition is depicted in FIG. 2. It will be noted that there is no movement of nut lock 30 which rotates with stud 22 since there is no retaining force to prevent its rotation as the stud is rotated.

Figure 3:
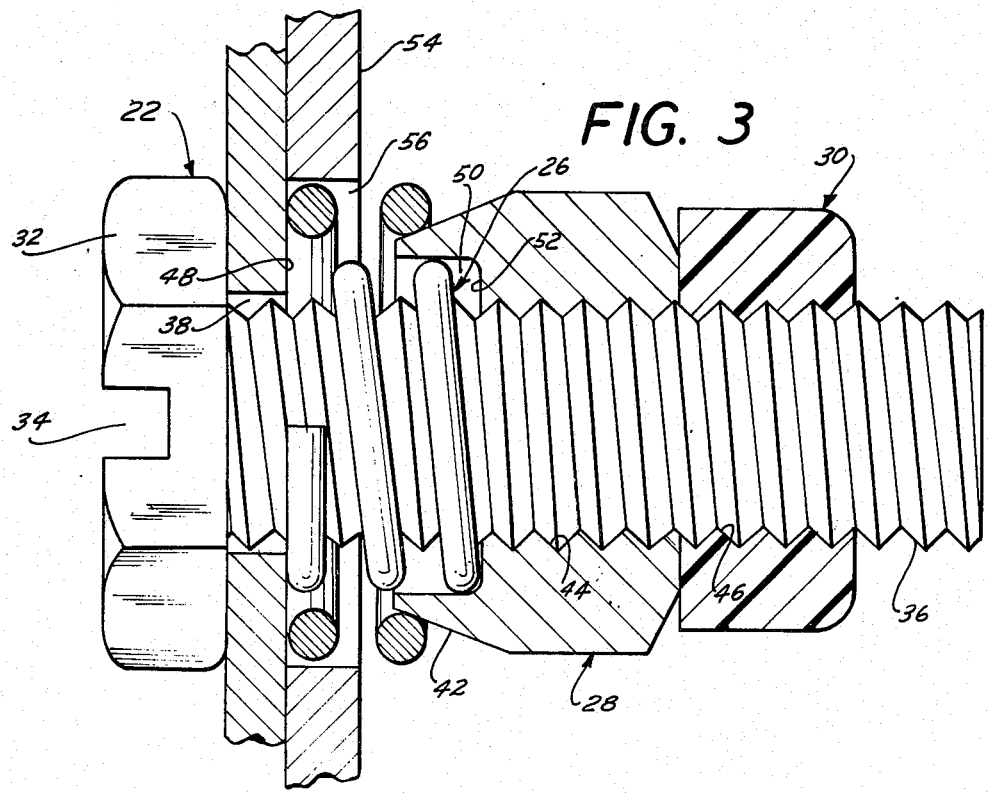
FIG. 3 is a sectional view thereof showing the fastener in the unlocked position in condition for removal of one member from the other.

Unfastening and disassembly is accomplished in a similar manner. The screwdriver is positioned in slot 34 and the stud is rotated in the reverse direction. Once again the biasing forces exerted by compress springs 26 and 24 will tend to engage with the hold nut 28 from rotation thereby causing the nut to axially move away from the members 40 and 54. This relaxes spring 24 to a sufficient degree so that it no longer is in locking interengagement with member 54 and the position of FIG. 3 is once again achieved. It should be noted that over loosening is avoided by the present of stop nut 30 which will prevent further axial movement of nut 28 and signal the user that the fastener is fully released. Naturally other convenient stop means can be employed in place of nut 30 such as those described above as long as it prevents the full axial displacement of nut 28 where it can fall from shank 36 and be lost behind the panels at a location where the user cannot gain access to the rear of panel or member 54. The assembly can then be removed through large opening 56. Panel 40 is in that manner freely disassembled from panel or member 54.

To once again review the manner in which the fastener is assembled initially, the stud 22 is first passed through aperture 38 in member 40. Springs 24 and 26 are then slid on shank 36 and the cone or tapered nut 28 is then threaded on to shank 36 until it compresses both springs 26 and 24 to the desired degree. The stop nut 30 which may be of plastic or metal is then threaded on to shank 36 to the desired axial location. The location is a matter of choice and should be chosen so that sufficient axial movement is permitted for the tapered cone nut 28 so that in one position the springs are compressed to some degree but not sufficient to be in a locked position and in a second position where the springs will be compressed to a greater degree and in the locking position. The cone nut should be left in the fully unfastened position abutting against the adjacent end of the stop nut 30 in which condition the fastener is ready for assembly to the second member or panel 54 in the manner described above.

In summary, fastener 20 has a threaded nut 28 with a conical outer surface to engage with a left hand wound larger diameter spring 24. To improve the force applied to nut 28 so that it does not rotate with the stud and can be dependably shifted between the locked and unlocked positions, an additional spirally wound spring 26 is inserted inside the larger helical spring 28. This spring 26 is wound right hand, the opposite of the exterior spring 24. Since spring 26 is not required to expand and lock against panel 54, it is made comparatively long so that it can be substantially preloaded between the cone nut 28 and the outer panel 40. Cone nut 28 has a recess 50 terminating in a shoulder 52 to provide space for spring 26, allowing nut 28 to move towards the outer panel 40. Spring 26 adds to the friction created by spring 24 between the cone nut 28 and the outer panel 40. In addition, it is wound with both ends projecting, for example, not with flat ends, so that these ends can bite into both the cone recess shoulder 52 and the outer panel 40 to prevent rotation. Since it is often more important to assure unlocking than locking, the right hand winding of spring 26 with the sharp ends provides more positive locking when unscrewing or loosening of fastener 20. All of the elements of fastener 20 can be of a conventional metal or plastic material.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

I claim:

1. A fastener assembly for use in the blind fastening together of first and second parts having aligned apertures extending therethrough with the aperture in the second part being larger than the aperture in the first part, said fastener assembly comprising:
   a stud member having a head and a relatively reduced threaded shank adapted to be projected through said aligned apertures with the head being positioned on the outer side of first part and being larger than the aperture therein;
   a nut having a threaded aperture therethrough for interengagement with the threaded shank to permit relative rotation therebetween, the nut having a nose portion on its outer surface tapered toward the first part, and the nut having a smaller outer diameter than the aperture in the second part so that it can be projected therethrough with the nut located on the opposite side of the second part from the first part;
   a first helical spring having a normal outer diameter larger than the aperture in the first part and smaller than the aperture in the second part assembled around said stud in engagement with the nut and the spring being expandible to have a larger outer diameter than the diameter of the aperture in the second part, the first helical spring being wound in a first direction;
   a surface on the end portion of the nut facing the first and second parts adapted to receive one end of a second helical spring, the other end of the second helical spring bearing against the first part, the second spring being assembled around said stud and under compression when the fastener assembly is inserted into the first part so as to exert a constant axial force on the nut to facilitate rotation of the threaded stud with respect to the nut, the second helical spring being wound in a second direction and being wound with end projections so that the ends can bite into both the nut and the first part to facilitate prevention of rotation of the nut when the stud is rotated, the second helical spring being formed with respect to the first helical spring so that relative rotation between the nut and shank to compress the springs will place a greater load on the second helical spring than the first helical spring to further facilitate retention of the nut against rotation when the stud is rotated;
   the first and second springs biasing the nut in a direction away from the first and second parts so that when the assembled shank portion of the stud and the spring and nut are inserted through the aperture in the second part with the springs extending under partial compression between the first part and the nut is restrained from rotation by the combined biasing forces of the springs, it will move axially toward the head of the stud to expand the first helical spring into engagement with the second part and retain the second part in fixed relationship with respect to the first part.

2. The invention in accordance with claim 1 wherein the end portion of the nut facing the first and second parts has a recess formed therein to receive and capture the one end of the second helical spring.

3. The invention in accordance with claim 1 wherein the second helical spring is longer than the first helical spring so that relative rotation of the stud and nut to axially move the nut toward the head of the stud will place a greater load on the second helical spring than the first helical spring.

4. The invention in accordance with claim 1 wherein a stop is provided on the shank engaging the nut to limit axial displacement of the nut.

5. The invention in accordance with claim 4 wherein the stop is a lock nut formed of a plastic material and is non-rotatably mounted on said shank.

6. The invention in accordance with claim 1 wherein the first helical spring is a left hand wound spring and the second helical spring is a right hand wound spring.

* * * * *